United States Patent
Yamada et al.

(10) Patent No.: US 8,656,140 B2
(45) Date of Patent: Feb. 18, 2014

(54) DATA PROCESSING DEVICE

(75) Inventors: Kazuo Yamada, Kanagawa (JP); Takao Naito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 687 days.

(21) Appl. No.: 12/963,072

(22) Filed: Dec. 8, 2010

(65) Prior Publication Data

US 2011/0320770 A1 Dec. 29, 2011

(30) Foreign Application Priority Data

Jun. 23, 2010 (JP) ................................. 2010-142862

(51) Int. Cl.
*G06F 13/00* (2006.01)
(52) U.S. Cl.
USPC ................................................ 712/1; 712/15
(58) Field of Classification Search
None
See application file for complete search history.

(56) References Cited

U.S. PATENT DOCUMENTS

| 6,753,878 | B1 * | 6/2004 | Heirich et al. | 345/629 |
| 6,883,084 | B1 * | 4/2005 | Donohoe | 712/1 |
| 7,620,821 | B1 * | 11/2009 | Grohoski et al. | 713/189 |
| 8,046,564 | B2 * | 10/2011 | Yang et al. | 712/15 |
| 8,055,880 | B2 * | 11/2011 | Fujisawa et al. | 712/15 |
| 2004/0019765 | A1 * | 1/2004 | Klein, Jr. | 712/15 |
| 2010/0122068 | A1 * | 5/2010 | Hokenek et al. | 712/208 |

FOREIGN PATENT DOCUMENTS

JP   A-2005-311745   11/2005

* cited by examiner

*Primary Examiner* — Eric Coleman
(74) *Attorney, Agent, or Firm* — Oliff PLC

(57) ABSTRACT

An internal buffer is provided for a DRP core. A selector SEL switches input/output destination of the DRP core between external memory and an internal buffer. Control software executed by a CPU core receives information a pipeline of configurations for a sequence of target processing and generates combinations as to whether the processing result is transferred between the configurations via the external memory or via the internal buffer as transfer manners. Next, for each manner, bandwidth and performance of the external memory used by the DRP core in the manner are calculated. The manner of the best performance satisfying a previously specified bandwidth restriction is selected among the manners and the selector SEL is switched in accordance with the manner.

2 Claims, 9 Drawing Sheets

FIG. 8

|  | USE BAND | PERFORMANCE |
|---|---|---|
| FIRST MANNER | 2 | 1 |
| SECOND MANNER | 0.227 | 0.79 |
| THIRD MANNER | 0.189 | 0.53 |

DATA PROCESSING DEVICE

CROSS-REFERENCE TO RELATED APPLICATION

This application is based on and claims priority under 35 USC 119 from Japanese Patent Application No. 2010-142862 filed on Jun. 23, 2010.

BACKGROUND

1. Technical Field

This invention relates to a data processing device.

2. Related Art

Reconfigurable circuits (also called programmable logic circuits) of a PLD (Programmable Logic Device), an FPGA (Field Programmable Gate Array), etc., whose internal logic circuit configuration can be reconfigured (changed) become widespread. Generally, the internal logic circuit configuration of the PLD or the FPGA is set at the circuit starting time, but a device whose logic circuit configuration can be changed during the operation of the circuit is also developed. In recent years, use of a dynamically reconfigurable processor (DRP) whose internal logic circuit configuration can be reconfigured at high speed (for example, in one clock cycle) has also advanced.

The logic circuit configuration reconfigured on a reconfigurable circuit is called configuration. In a system using a reconfigurable circuit, generally, the configuration of the reconfigurable circuit is rewritten in order, whereby a circuit of a scale that cannot be configured on the reconfigurable circuit at a time can be implemented using the reconfigurable circuit.

In the system using the reconfigurable circuit, generally the reconfigurable circuit is often used under the control of a general-purpose CPU. A combination of software processing of a part of a processing sequence by a CPU and hardware processing of another part by a reconfigurable circuit is often conducted. Hitherto, in such a system, generally each of the CPU and the reconfigurable circuit has been provided with dedicated memory and data being processed by each of the CPU and the reconfigurable circuit has been read from and written to their respective memories.

In contrast to the conventional implementation system, it is considered that work memory of the CPU and the reconfigurable circuit is made common, whereby the memory cost is reduced and device is installed in an existing ASCI, etc., as IP core, whereby the device cost is reduced and the board occupation area is also decreased. In this case, however, it is necessary to note the relationship among bandwidths of the CPU, the reconfigurable circuit, and the memory. For example, to use the reconfigurable circuit (particularly, DRP) for image processing such as processing of a bit map image in print, handled image data is large and thus the input/output bandwidth of the reconfigurable circuit occupies the memory bandwidth and the memory band assigned to the CPU (and its peripheral devices) cannot be assigned.

In contrast, for example, it is also considered that an internal buffer of a small capacity is created on a chip on which a reconfigurable circuit is mounted and the processing result of the configuration formed on the reconfigurable circuit is passed to the next configuration through the internal buffer, whereby the memory band used by the reconfigurable circuit is decreased. To use the internal buffer of the small capacity, the data to be processed needs to be separated for each amount responsive to the capacity of the buffer for processing. In window processing of reading data of one window width with one data point (for example, pixel) as the reference to calculate the data point, for example, like filtering of an image, it is necessary to read extra data as much as the window width at both ends of the range of the data to be processed. Thus, to separate the data to be processed in a comparatively small amount at a time and read the data into the internal buffer, the relative rate of the window width to the amount of the data to be processed becomes high, resulting in degradation of the processing performance (processing efficiency). For example, filtering using a filter of 11×11 pixels is applied to a 33-line image read from the internal buffer, only 23-line image is obtained as the processing result and the processing efficiency becomes 23/33=about 70%.

SUMMARY

According to an aspect of the invention, a data processing device includes a reconfigurable circuit, a reconfiguration unit, an internal memory, a connection circuit, a selection unit and a selection control unit. The reconfigurable circuit includes a plurality of configurations. The reconfiguration unit reconfigures the plurality of configurations in order so as to configure a pipeline. The connection circuit connects to an external memory in an external device. The selection unit selects connection destinations for data input and data output of each of the configurations reconfigured on the reconfigurable circuit from between the internal memory and the external memory via the connection circuit. In a first data transfer manner, data to be processed is input to a top configuration in the pipeline without the data being divided, each configuration in the pipeline are processed, and a processing result of each configuration is transferred to the next configuration in the pipeline through the external memory. In a second data transfer manner, the data to be processed is divided into data units of the data amount responsive to the capacity of the internal memory and is input to a top configuration in the pipeline, each configuration in the pipeline are processed, and a processing result of each configuration is transferred to the next configuration in the pipeline through the internal memory. The selection control unit (i) calculates a bandwidth of the pipeline based on the data input/output to/from the external memory in each of the data transfer manners and a performance index value of the pipeline based on the ratio of the amount of data output from the pipeline to the amount of data input to the pipeline in each of the data transfer manners, (ii) selects one of the data transfer manners based on the bandwidth and the performance index value of each of the data transfer manners, and (iii) controls a selection of the selection unit in accordance with the selected data transfer manner.

BRIEF DESCRIPTION OF THE DRAWINGS

Exemplary embodiments of the invention will be described in detail based on the following figures, wherein:

FIG. 8 is a drawing to show a table listing index values of used memory bandwidths and performance of the first to fourth manners.

DETAILED DESCRIPTION

Figure 1:
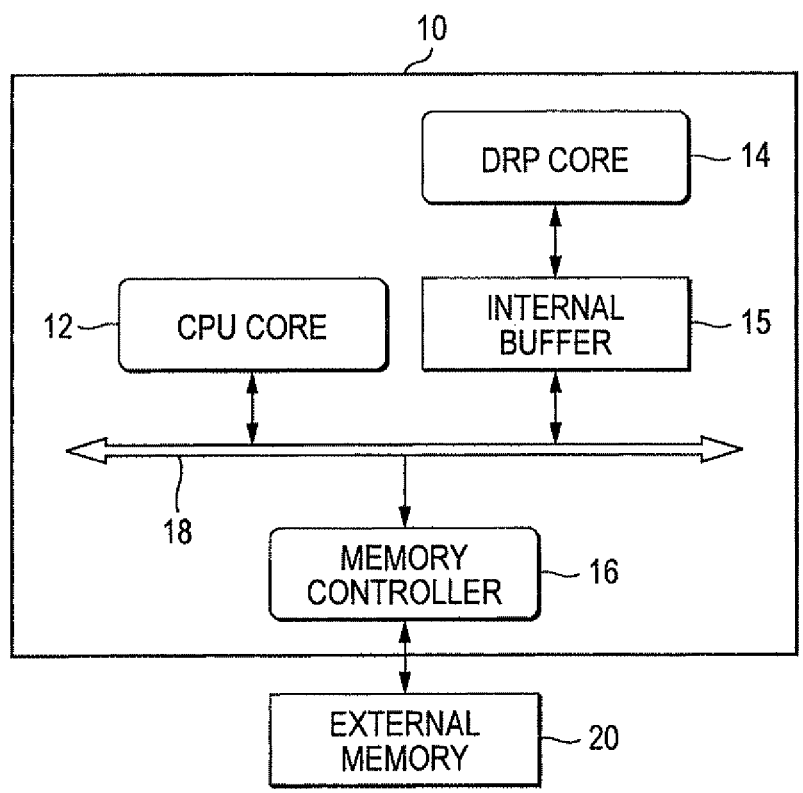
FIG. 1 is a drawing to show an example of the schematic configuration of a DRP system of an embodiment of the invention.

FIG. 1 shows a configuration example of a DRP system to which control of an embodiment of the invention is applied. The system includes a CPU and DRP mix chip 10 and external memory 20.

The CPU and DRP mix chip 10 is an integrated circuit chip wherein a CPU (central processing unit) core 12, a DRP (dynamically reconfigurable processor) core 14, an internal buffer 15, a memory controller 16, and other peripheral circuits are integrated in the form of an ASIC (Application Specific Integrated Circuit), etc. The CPU core 12, the memory controller 16, and the internal buffer 15 are connected to an internal bus 18, and the DRP core 14 is connected to the internal buffer 15. The external memory 20 is connected to the memory controller 16 and the CPU core 12 and the DRP core 14 can access the external memory 20 through the memory controller 16. The example shown in the figure is only one example; for example, the DRP core 14 may be directly connected to the internal bus 18 in place of the internal buffer 15 and the internal buffer 15 may be connected to the DRP core 14. In addition, software processing of a part of a processing sequence is performed by a CPU (external memory) in an external device which is a main computer added to the CPU and DRP mix chip 10, and hardware processing of another part is performed by a reconfigurable circuit.

The DRP core 14 includes a plurality of circuit elements (PEs: Processor elements) for making up a logic circuit and wiring resources for connecting the PEs and can operate as logic circuits of various configurations by changing setting of the PEs and the connection configuration of the PEs. The DRP core 14 includes a plurality of configuration memories. Configuration data for defining one configuration is stored in one configuration memory. Here, the term "configuration" is used to mean logic circuits existing at the same time on the reconfigurable circuit. In the DRP core 14, when one of the configuration memories is made active, setting of the PEs and wiring of the PEs are changed in accordance with the data retained in the memory, whereby circuits of the configuration are formed. Only one configuration memory is active at one point in time and another configuration memory is made active, whereby the configuration of the DRP core 14 is switched. For example, configuration data pieces to be switched in order are loaded into different configuration memories and the configuration memories are made active in order, whereby pipeline processing based on the configuration sequence can be realized. While one configuration memory is active, data is loaded into another configuration memory, so that the time required for the loading is hidden. Data is transferred between the configurations formed in the DRP core 14 selectively using the internal buffer 15 or the external memory 20.

The CPU core 12 executes reconfiguration (rewrite) of the configuration of the DRP core 14 and reconfiguration control software (not shown) for controlling the operation of the reconfigured configuration. The CPU core 12 can execute application software (not shown) of image processing, etc., can call the DRP core 14 from the application software, and can cause the configuration group on the DRP core 14 to perform specific processing by hardware. The CPU core 12 executes such application processing, for example, in response to a command from a high-order system (not shown) (for example, a high-order CPU for executing large software for controlling a printer).

The memory controller 16 controls memory access to the external memory 20 from the CPU core 12 and the DRP core 14.

Figure 2:
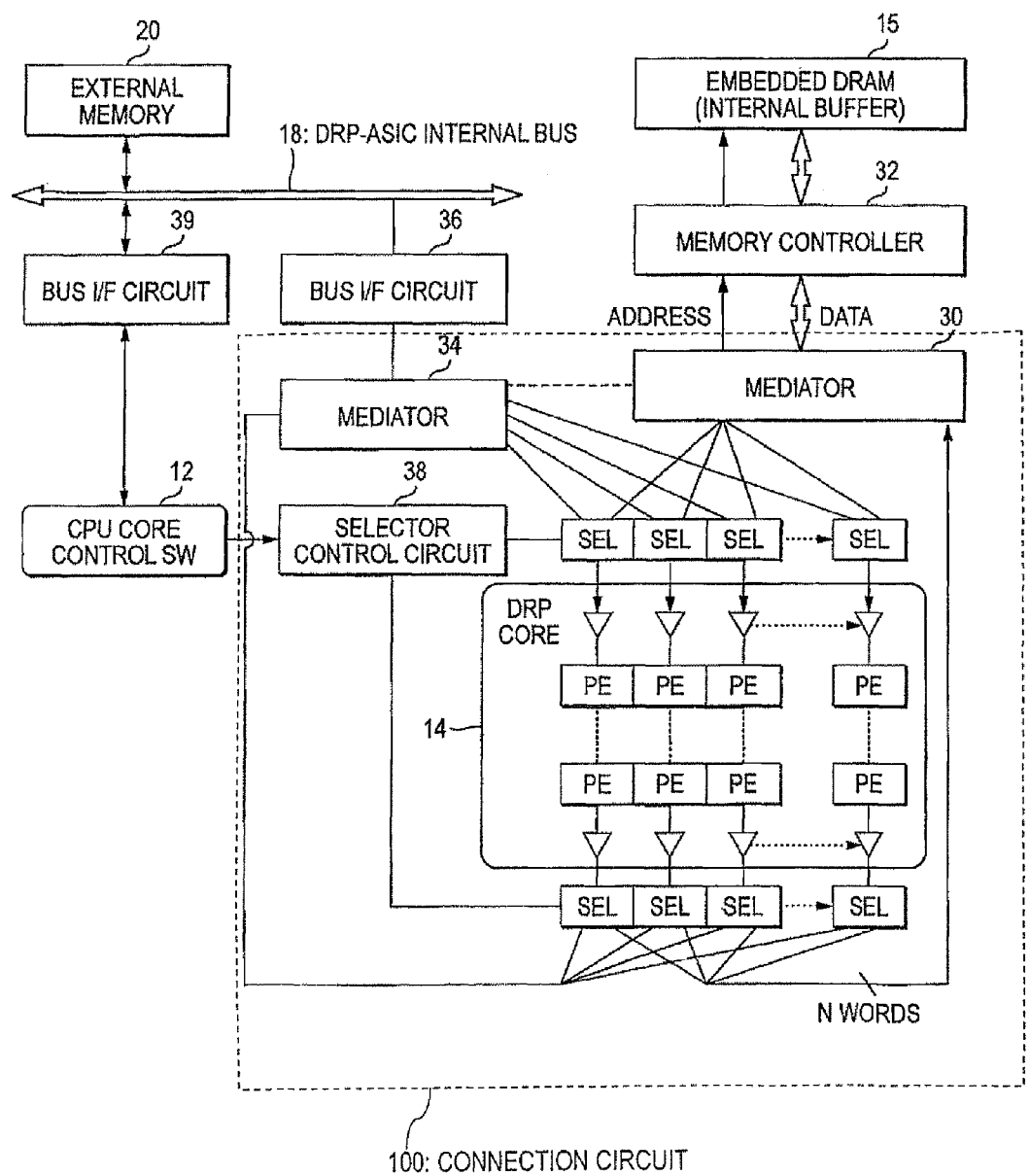
FIG. 2 is a drawing to show an example of the detailed configuration of the DRP system of the embodiment of the invention.

An example of the further detailed configuration of the DRP system of the embodiment will be discussed with reference to FIG. 2. In the example, input and output of the DRP core are connected to mediators 30 and 34 through selector SEL. The mediator 30 is a circuit for mediating a read/write request from/to the internal buffer 15 and is connected to embedded DRAM of the internal buffer 15 through a memory controller 32. The memory controller 32 controls access to the internal buffer from the DRP core 14. The embedded DRAM may be any other on-chip memory such as SRAM.

The mediator 34 is a circuit for mediating a read/write request from/to the external memory 20. The mediator 34 is connected to the internal bus 18 of the chip 10 through a bus I/F (interface) circuit 36, whereby the DRP core 14 can access the external memory 20 through the internal bus 18. The bus I/F (interface) circuit 36 is an interface circuit for connecting the DRP core 14 to the internal bus 18 through the mediator 34. A bus I/F (interface) circuit 39 is an interface circuit for connecting the CPU core 12 to the internal bus 18. A selector control circuit 38 switches the selection state of each selector SEL on the input side and the output side of the DRP core 14 on the mediator 34 (external memory 20) side and the mediator 30 (internal buffer 15) side in response to control of the CPU core 12. As shown in the figure, the DRP core 14 has a plurality of input channels (also called streams) and a plurality of output channels and each selector SEL is provided for each of the channels. That is, a plurality of circuits in configuration reconfigured in the DRP core 14 can read and write data from and to different memory addresses using different channels and can switch the read and write destinations to the internal buffer 15 or the external memory 20 for each channel. And, FIG. 2 shows a connection circuit 100.

Figure 3:
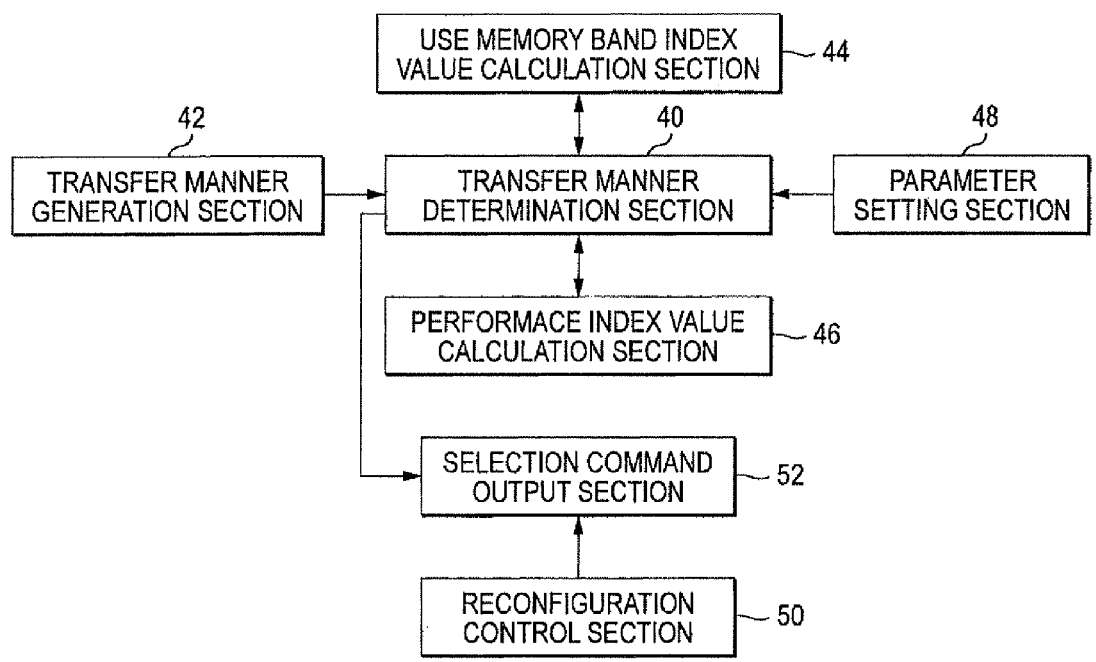
FIG. 3 is a drawing to show an example of the function configuration of control software for reconfiguration control of a DRP core.
Figure 4:
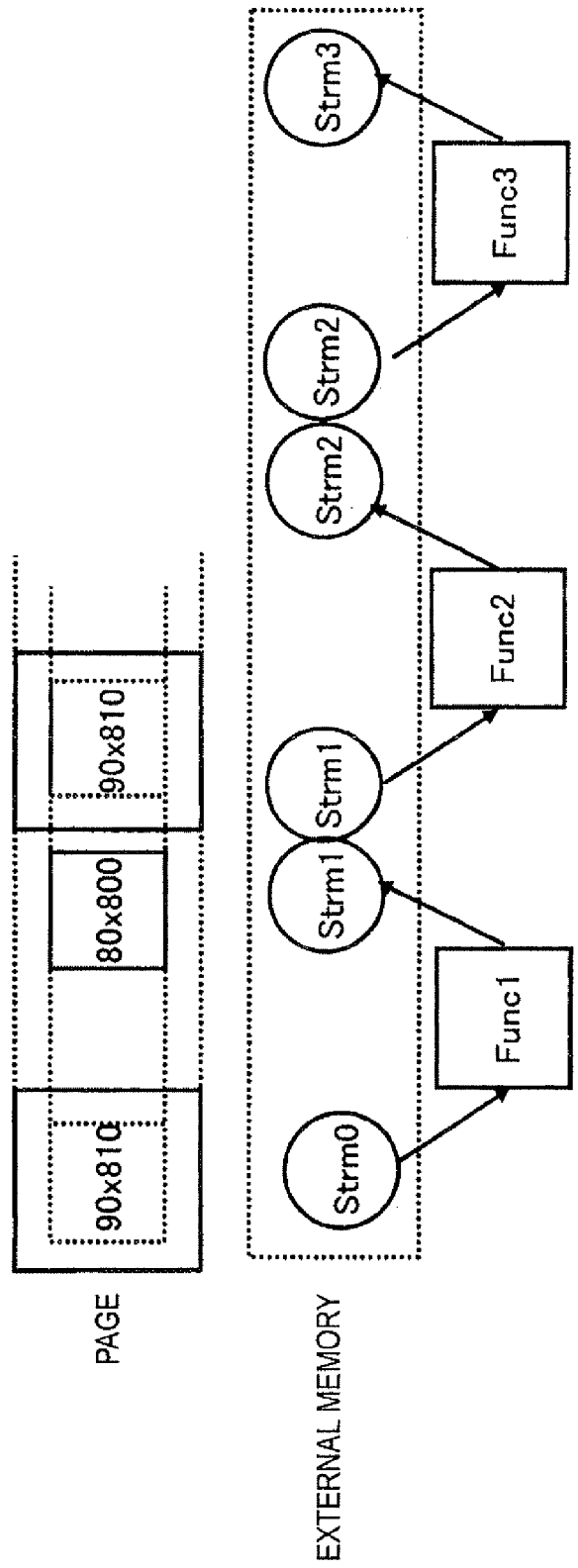
FIG. 4 is a drawing to describe a first manner of a specific example of data transfer manner.

FIG. 3 shows an example of the function configuration of control software for reconfiguration control of the DRP core 14, executed by the CPU core 12. In the example, a reconfiguration control section 50 reconfigures a sequence of configurations making up a time-series pipeline in order on the DRP core 14 and operates the pipeline. A row made up of such a sequence of configurations is called configuration pipeline. A transfer manner determination section 40 determines whether data (processing result) between the configurations of the pipeline is transferred via the internal buffer 15 or via the external memory 20. Input data to the top configuration of the pipeline and the output data from the last configuration are retained in the external memory to access from the CPU core 12, but data may be transferred between adjacent configurations via the internal buffer 15 or via the external memory 20.

To transfer data via the internal buffer 15, the band of the external memory can be released accordingly. However, on the other hand, the internal buffer 15 is embedded in the chip 10 and thus cannot take capacity as large as the external memory 20. For example, the data amount of a full-color print page image is about 100 megabytes per page (in the case of three colors) with A4 size and resolution 600 dpi (dots per inch). Usually, as the external memory 200, memory having a capacity of several hundred megabytes to several gigabytes is used, but the capacity of the internal buffer 15 embedded in the limited integrated circuit is at most about several megabytes and the whole image of one page cannot be stored. Thus, to transfer data via the internal buffer 15, the data to be processed input to configuration is divided into units each stored in the internal buffer 15 and the data is input to the DRP core 14 for each unit for processing. As described above, in widow processing of filtering, etc., it is necessary to read larger data as much as the window size than the amount of data generated by processing. As the read data is smaller, the rate of occupation of the window size becomes larger and thus the rate of the processing result data to the read data (called performance of processing, namely, processing efficiency) lessens.

To divide raster image data of a page for printing, generally the data is divided into bands for each height (number of lines) along a subscanning direction.

On the other hand, to transfer data between configurations via the external memory 20, lowering of processing efficiency as with the internal buffer 15 does not occur. However, instead, the band of the external memory is much used and there is a possibility that access to the external memory 20 from the CPU core 12 and other peripheral devices may be oppressed.

Then, the transfer manner determination section 40 determines the appropriate transfer manner from the viewpoint of the balance of performance and the use band of the external memory 20.

Data transfer via the internal memory 15 or the external memory 20 can be selected for each spacing between adjacent configurations (as time) in the configuration pipeline. Thus, the data transfer manner of one configuration pipeline becomes a combination of the selection results about each spacing.

The data to be processed may be divided into units (for example, band division of raster image data) when the data is transferred via the external memory. In this case, data is transferred in one spacing between configurations in the three manners: Data is transferred via the external memory 20 without dividing the data to be processed; data is transferred via the external memory 20 by dividing the data into units; and data is transferred via the internal buffer 15 by dividing the data into units.

A transfer manner generation section 42 receives information of the configuration pipeline to be formed in the DRP core 14 (namely, information containing configuration data defining each configuration and information of the arrangement order of the configurations), the transfer manner generation section 42 generates all transfer manners that can be adopted in the pipeline. The generated data transfer manners contain (1) a manner in which the data to be processed is not divided and is transferred via the external memory 20 over the whole pipeline and (2) a manner in which the data to be processed is divided for each unit of the data amount responsive to the capacity of the internal buffer 15 (for example, band) and is transferred via the internal buffer 15 over the whole pipeline. (3) a manner in which the data to be processed is divided for each unit and is transferred via the external memory 20 over the whole pipeline may be contained. The transfer manner generation section 42 may generate as many as combinations of selection of any of manners (1) to (3) for each between configurations of the pipeline as a mix manner.

The transfer manner determination section 40 determines the optimum data transfer manner from among the generated data transfer manners from the viewpoint of performance (processing efficiency) of the configuration pipeline generated in the DRP core 14 and the band used by the DRP core 14, of the memory band of the external memory 20. The use memory band of the DRP core 14 is calculated by a use memory band index value calculation section 44 and the performance is calculated by a performance index value calculation section 46. The calculations are described later with a specific example.

A parameter setting section 48 is a user interface for accepting setting of parameters and conditions used to determine the transfer manner and calculate the use memory band and the performance index value of the DRP core 14 and the like from the user. For example, the setup parameters and conditions contain one or more of information indicating whether or not each of the configurations making up the configuration pipeline performs window processing, the window size to perform window processing, the size of data to be processed, the upper limit band (called band width restriction) allocated to the DRP core 14, of all memory band of the external memory 20, etc. The calculation and determination using the parameters is described later with a specific example.

The data transfer manner determined by the transfer manner determination section 40 is set in a selection command output section 52. The selection command output section 52 issues a command for switching the selection state of the selector SEL to the selector control circuit 38 in accordance with the setup data transfer manner, and the selector control circuit 38 switches the connection destination of each selector SEL in accordance with the command. Whenever the reconfiguration control section 50 rewrites the configuration of the DRP core 14, the selection command output section 52 may select the data input source and output destination for the configuration after the rewrite.

Next, specific examples of the data transfer manners will be discussed with reference to FIGS. 4 to 7. Here, a pipeline made up of three configurations each for performing image processing using a filter of 11×11 pixels is assumed as a specific example of the configuration pipeline. The three configurations are named Func1, Func2, and Func3 in order from the top of the pipeline. From a condition of falling within the capacity of the internal buffer 15, it is assumed that the number of divisions of the image data to be processed is determined to be 10 bands.

The first manner shown in FIG. 1 is a manner in which a page image to be processed is not divided into bands and data is transferred between the configurations via the external memory 20. In the manner, Func1 is reconfigured in the DRP core 14 and a one-page image is read from the external memory 20 to the DRP core 14 (strm0 in the figure). "strm" means "stream" of data. Hereinafter, data input to the DRP core 14 and data output from the DRP core 14 are called "stream." Accordingly, Func1 processes data of the page and the stream of the processing result of one page is written into the external memory 20 (strm1). Next, Func2 is reconfigured in the DRP core 14 and the one-page processing result is input to Func2 (strm1) for processing, whereby the one-page processing result is written into the external memory 20 (strm2). Func3 reads the processing result of Func2 from the external memory 20, processes it, and writes the processing result to the external memory 20.

In the system, considering the filter of 11×11 pixels, to obtain the processing result of the page image, replication processing of replicating pixels of four sides (outermost) of the page five pixels per side needs to be performed, thereby expanding the page a total of 10 pixels each vertically and horizontally. The replication may be performed for each configuration. In the manner involving band division described later, the same data needs to be read duplicately over a plurality of bands. In the first manner, however, the replication is required, but duplicate data read as with band division is not required. The replicated vertical and horizontal 10-pixel widths are small as they can be ignored from the whole page (in FIG. 4, the page size is shown as 80×800 pixels for convenience from the relationship with FIG. 5, etc.; in fact, however, the numbers of vertical and horizontal pixels are far larger than 80×800 pixels). Thus, letting the size of the final output data (one page) of the configuration pipeline be "1," the amount of input data and output data of each of Func1, Func2, and Func3 may be strm1=strm2=strm3=1. Since each configuration inputs and outputs data of size "1," data of size "6" is transferred to and from the external memory in the whole configuration pipeline. That is, in average per configuration, a stream of size "2" is read from and written into the external memory 20. That is, in the manner, the index value representing the band of the external memory 20 used by the DRP core 14 becomes "2." The stream size "2" is multiplied by the data size of the actual final output data and is divided by the time taken for one configuration to process one page, whereby the value of the band of the external memory 20 actually used by the DRP core 14 is obtained.

In the first manner, the data sizes of the input and output streams of the configuration pipeline substantially equal and thus the performance index value (processing efficiency) of the ratio of the output stream size to the input stream size is 1.0.

Figure 5:
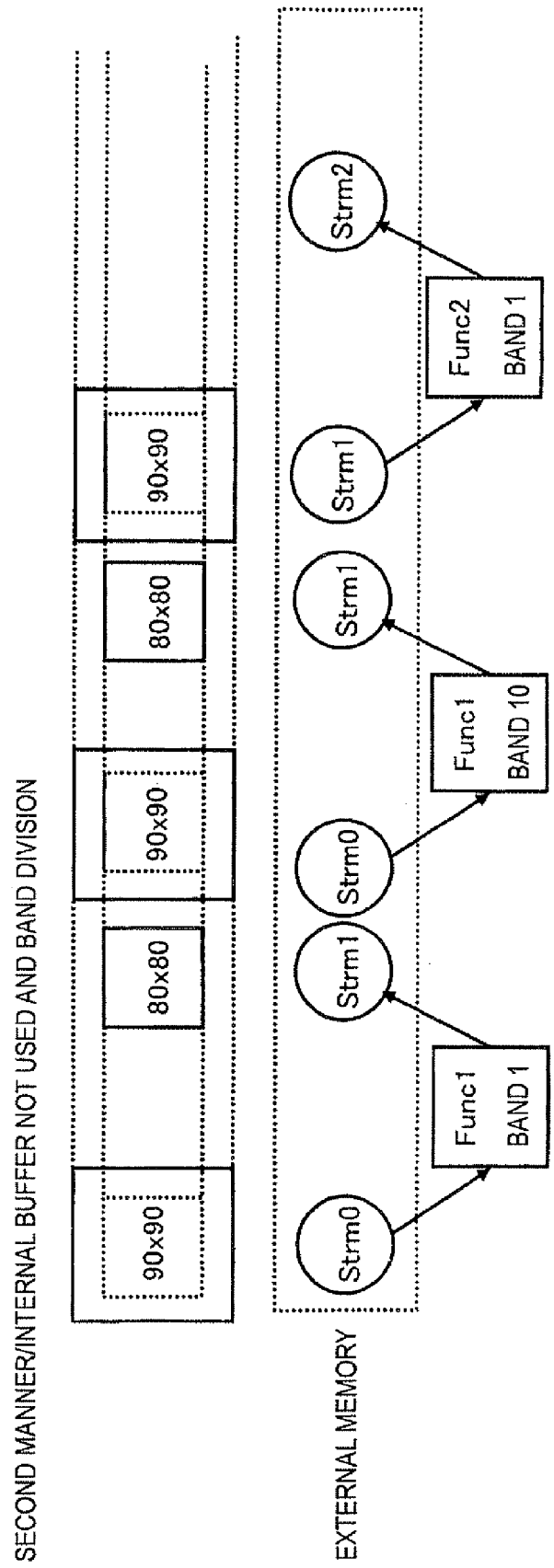
FIG. 5 is a drawing to describe a second manner of a specific example of data transfer manner.

The second manner illustrated in FIG. 5 is a manner in which each page is divided into 10 bands and data is transferred between the configurations via the external memory 20. In the description, for convenience, the number of pixels of one band of an output page is 80×80. If one page is input or output to the DRP core collectively, when the bandwidth of the external memory 20 given to the DRP core is exceeded, if band division is performed, the input/output data amount of the DRP core can be adjusted in band units and thus it is also made possible to satisfy given bandwidth.

In the manner, Func1 is reconfigured in the DRP core and then one band at a time is input to Func1 in order and data on the whole page (namely, from the first band to the tenth band) is processed and then Func1 is rewritten to Func2 and the same processing is repeated. For example, after Func1 outputs data of 80×80 pixels of the processing result of one band to the external memory 20, the DRP core 14 is rewritten to Func2 and replication required for the processing result of Func1 is performed to generate data of one page. The data is divided into bands and the configuration of Func2 is caused to process one band at a time. Accordingly, Func2 writes the processing result of one band at a time to the external memory 20 in order and finally outputs the processing result of one page to the external memory 20. Next, Func2 is rewritten to Func3 and similar processing is performed.

In the second manner, to obtain the output result of one band (80×80 pixels) in each configuration (Func), 90×90 pixels need to be read. Letting the data size of the output result per band of one configuration Func be 1, the input data size becomes 90×90/(80×80)=about 1.27. Therefore, the size of a stream input/output to/from the external memory 20 for one configuration to process one band becomes 1+1.27=2.27. The data is divided into 10 bands, whereby 2.27 is divided by 10, whereby the input/output stream size of the DRP core 14 becomes 0.227. This value becomes the index value of the band width of the external memory 20 used by the DRP core 14 in the second manner.

In the manner, each configuration inputs 90×90 pixels for each pixel and outputs 80×80 pixels. The performance of each configuration in the second manner becomes output stream size/input stream size=80×80/(90×90)=029. The performance of the whole pipeline made up of three configurations is the lowest performance of the configurations in the pipeline and thus becomes 0.79 in the manner. That is, the performance of the second manner becomes 0.79 times the performance of the first manner (band division is not performed and data is transferred via the external memory 20). That is, performance degradation of 21% relative to the first manner is observed.

Figure 6:
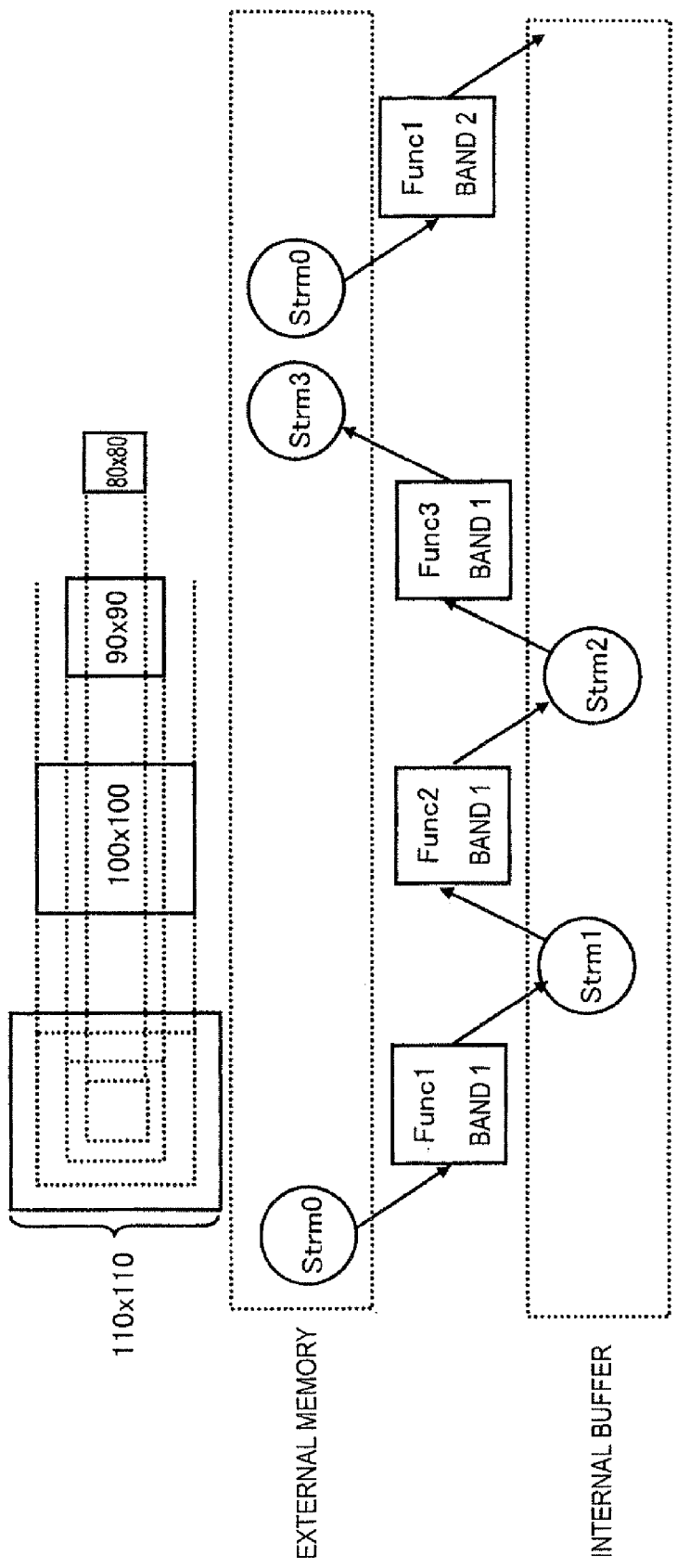
FIG. 6 is a drawing to describe a third manner of a specific example of data transfer manner.

Next, the third manner will be discussed with reference to FIG. 6. In the manner, data is transferred between configurations via the internal buffer 15. To transfer data via the internal buffer 15, band division is required and data is divided into 10 bands.

In the third system, Func1 is reconfigured in the DRP core 14 and data of one band is input to Func1 for processing. Func1 is caused to output the processing result. Next, Func2 is reconfigured and is caused to process the processing result of Func1 in the internal buffer 15 and is caused to output the processing result to the internal buffer 15. Next, Func3 is reconfigured and is caused to process the processing result of Fun2 in the internal buffer 15. Since Func3 is the last of the pipeline, the processing result is output to the external memory 20. Processing of one band is now complete. The cycle is repeated until the final processing result of one page is obtained.

In the third manner, Func2 and Func3 cannot get data more than the data in the internal buffer 15 and in filtering, the processing result becomes smaller than input. Thus, the effective data amount of the processing result decreases as processing is performed in the order of Func1, Func2, and Func3. Considering the filter size of 11×11 pixels, to finally obtain data of 80×80 pixels of one band, Func1 reads data of 110× 110 pixels per band. Therefore, letting the stream size of 80×80 pixels of the final output of the pipeline be 1, the input stream size for Func1 becomes 110×110/(80×80)=about 1.89. On the other hand, Func1 outputs data to the internal buffer 15 and thus does not output data to the external memory 20. That is, the output stream size of Func1 is 0. Therefore, the input/output stream size of Func1 per band becomes 1.89+0=1.89 in total. Func2 inputs data from the internal buffer 15 and outputs the processing result to the internal buffer 15 and thus the total of the input and output stream sizes is 0. Func3 inputs data from the internal buffer 15 and thus the input stream size is 0 and outputs 80×80 pixels per band and thus the output stream size is 80×80/(80×80)=1. In the whole pipeline, the input/output of Func1 involving the most input/output is dominant and thus the input/output stream size of the whole pipeline becomes 1.89. In the manner, data is divided into 10 bands and thus the input/output stream size per band becomes a value of 0.189 (1.89/10). This value becomes the index value of the bandwidth of the external memory used by the DRP core 14 in the third manner.

In the manner, in the whole configuration pipeline, 110× 110 pixels per band are input and 80×80 pixels are output. Therefore, the performance of the whole pipeline becomes output stream size/input stream size=80×801(110×110) =about 0.53.

The three manners of the first, second, and third manners have been described as the data transfer manner between the configurations. In the three manners, the same data transfer manner (namely, combination of the presence or absence of band division and data transfer via internal buffer or via external memory) is used in all spacings between the configurations (namely, between Func1 and Func2 and between Func2 and Func3). However, as understood by those skilled in the art, a combination manner in which the data transfer manner is selected individually for each spacing between the configurations in the configuration pipeline and the manners are combined can be adopted.

Figure 7:
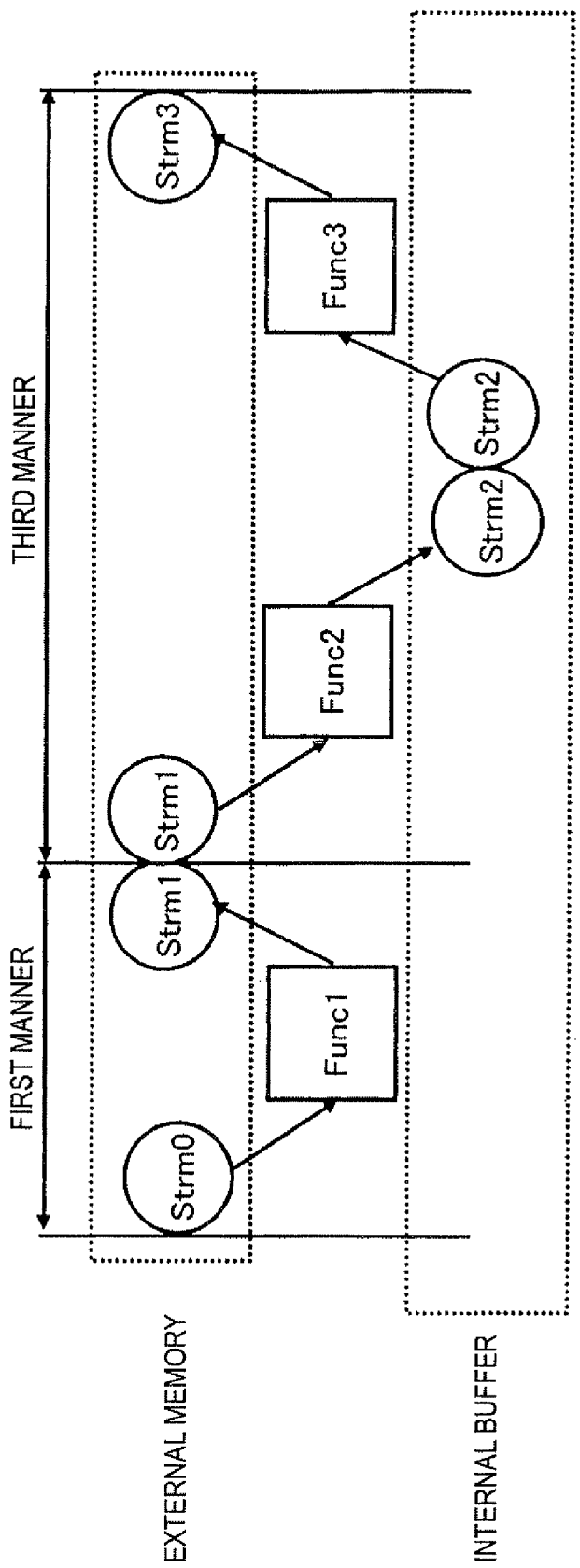
FIG. 7 is a drawing to describe a fourth manner of a specific example of data transfer manner.

For example, a manner as in FIG. 7 is also possible. In the manner, first, Func1 is reconfigured in the DRP core 14 and data of one page is input to Func1. Func1 is caused to process data and output the processing result to the external memory 20. Next, Func2 is reconfigured and the processing result of Func1 in the external memory 20 is divided into bands. Func2 is caused to process data of one band and output the processing result to the internal buffer 15. Next, Func3 is reconfigured and is caused to process the processing result of Func2 in the internal buffer 15. Func3 is the last of the pipeline and thus is caused to output the processing result to the external memory 20. Processing of the data of one band is now complete. Then, the DRP core 14 is again rewritten to Func2, the next band is read from the external memory 20, and Func2 is caused to process data of the band. The processing result is transmitted to next Func3 via the internal buffer 15 for processing. The cycle of Func2 and Func3 is repeated until the final processing result of one page is obtained. That is, in the example in FIG. 7, the first manner is adopted between Func1 and Func2 and the third manner is adopted between Func2 and Func3. Of course, the combination illustrated in FIG. 7 is only one example and other combinations are also possible.

The input/output size and the performance index value of such a combination manner can be found in accordance with the idea described above in the first to third manners.

FIG. 8 lists the index values of the bands and the processing performance of the external memory 20 used by the DRP core 14 about three manners of the first to third manners described above.

Thus, a large number of data transfer manners are considered even in the simple case of "pipeline made up of three configurations each for performing image processing using the filter of 11×11 pixels. However, in the description to follow, for simplicity, it is assumed that only the first to third manners described above in detail are generated by the transfer manner generation section 42.

Figure 9:
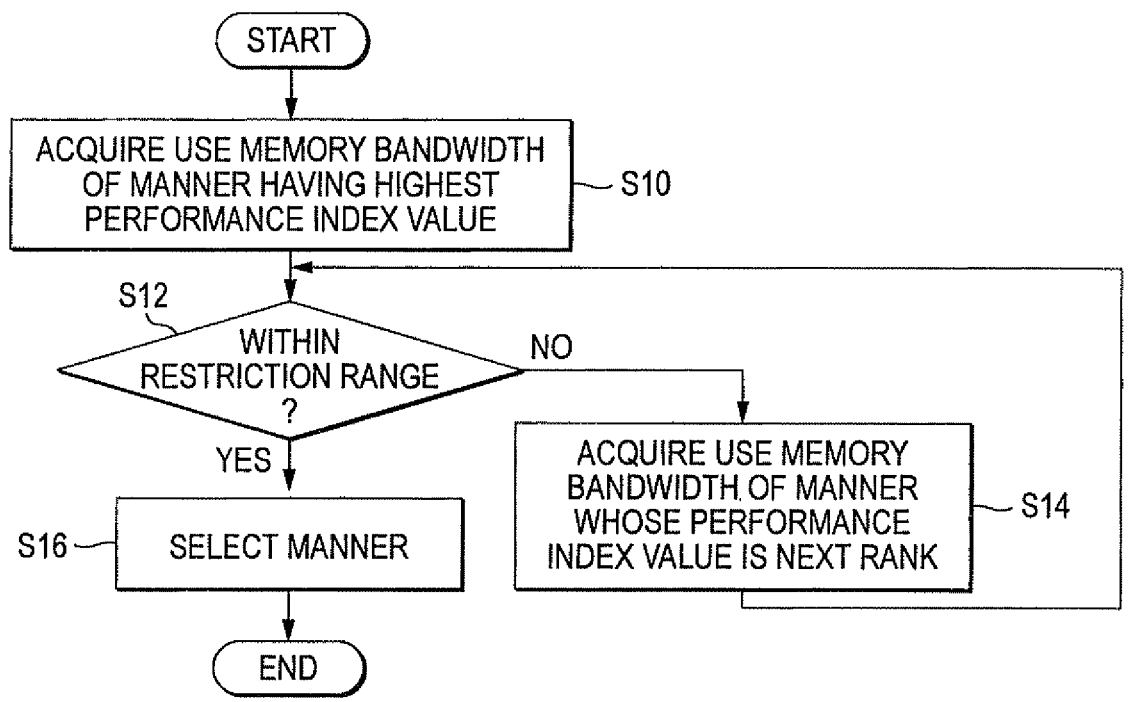
FIG. 9 is a flowchart to show an example of a processing procedure of a transfer manner determination section.

Upon reception of information of each generated manner, the transfer manner determination section 40 first causes the use memory band index value calculation section 44 and the performance index value calculation section 46 to calculate the index values of the use memory band and the performance of each generated manner. To calculate the index values, the data amount of the data to be processed (for example, the number of pixels of one page) and information of the processing description of each configuration (for example, whether or not a window of a filter, etc., is used and if it is used, the size of the window) are required; these are preset by the user through the parameter setting section 48. The generated manners are evaluated based on the calculation result and the most appropriate manner is determined in satisfying constraints of the bandwidth restriction, etc., (preset by the user through the parameter setting section 48). FIG. 9 shows an example of the determination procedure.

In the procedure in FIG. 9, the transfer manner determination section 40 first selects the generated data transfer manner having the highest performance index value and acquires the index value of the bandwidth of the external memory 20 used by the DRP core 14 in the manner (S10). The transfer manner determination section 40 determines whether or not the memory bandwidth indicated by the index value is within the range of the bandwidth restriction set through the parameter setting section 48 (namely, the upper limit of the band of the external memory 20 given to the DRP core 14) (S12). To make the determination, the index value and the value of the bandwidth restriction differ in units, the values are converted so that the both units become the same. If the index value of the use bandwidth is not within the range of the restriction, the transfer manner determination section 40 selects the data transfer manner whose performance index value is the next rank and acquires the index value of the use memory bandwidth of the manner (S14) and determines whether or not the bandwidth indicated by the index value satisfies the bandwidth restriction (S12). Thus, a loop of S12 and S14 is repeated until the manner whose use memory bandwidth satisfies the bandwidth restriction is found. If the manner whose use memory bandwidth satisfies the bandwidth restriction is found (the determination result at S12 is Yes), the manner is selected and is set in the selection command output section 52.

In the example in FIGS. 4 to 8, the use memory band of each manner is evaluated in the order of the first, second, and third manners in the descending order of the performance index value and the manner first satisfying the bandwidth restriction is selected.

The procedure in FIG. 9 is only an example. Any procedure may be used if the procedure is a procedure of selecting the manner of the best performance satisfying the bandwidth restriction among the generated data transfer manners.

In the example, for simplicity of the description, three configurations use filters of the same size. In the actual configuration pipeline, the number of configurations is not limited to three and the configuration pipeline may be made up of two or more configurations. In fact, the sizes of the windows used by the configurations may differ and the pipeline may contain a configuration using no window (namely, one pixel is input and data of one pixel is output as the processing result). Color space conversion processing is an example of processing using no window (filter).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing device comprising:
   a reconfigurable circuit that includes a plurality of configurations;
   a reconfiguration unit that reconfigures the plurality of configurations in order so as to configure a pipeline;
   an internal memory;
   a connection circuit that connects to an external memory in an external device;
   a selection unit that selects connection destinations for data input and data output of each of the configurations reconfigured on the reconfigurable circuit from between the internal memory and the external memory via the connection circuit, wherein
   in a first data transfer manner, data to be processed is input to a top configuration in the pipeline without the data being divided, each configuration in the pipeline are processed, and a processing result of each configuration is transferred to the next configuration in the pipeline through the external memory, and in a second data transfer manner, the data to be processed is divided into data units of the data amount responsive to the capacity of the internal memory and is input to a top configuration in the pipeline, each configuration in the pipeline are processed, and a processing result of each configuration is transferred to the next configuration in the pipeline through the internal memory; and a selection control unit (i) that calculates a bandwidth of the pipeline based on the data input/output to/from the external memory in each of the data transfer manners and a performance index value of the pipeline based on the ratio of the amount of data output from the pipeline to the amount of data input to the pipeline in each of the data transfer manners, (ii) that selects one of the data transfer manners based on the bandwidth and the performance index value of each of the data transfer manners, and (iii) that controls a selection of the selection unit in accordance with the selected data transfer manner.

2. The data processing device as claimed in claim 1, wherein the selection control unit selects the data transfer manner having the highest performance indicated by the performance index value among the data transfer manners whose bandwidth is equal to or less than a preset restriction value.

* * * * *